(12) United States Patent
Caveney et al.

(10) Patent No.: US 8,382,515 B2
(45) Date of Patent: Feb. 26, 2013

(54) HIGH DENSITY PATCH PANEL

(75) Inventors: Jack E Caveney, Hinsdale, IL (US); Mark J Donnell, Orland Park, IL (US)

(73) Assignee: Panduit Corp., Tinley Park, IL (US)

(*) Notice: Subject to any disclaimer, the term of this patent is extended or adjusted under 35 U.S.C. 154(b) by 0 days.

(21) Appl. No.: 12/206,837

(22) Filed: Sep. 9, 2008

(65) Prior Publication Data

US 2009/0004913 A1 Jan. 1, 2009

Related U.S. Application Data

(63) Continuation of application No. 10/814,877, filed on Mar. 31, 2004, now abandoned.

(60) Provisional application No. 60/459,217, filed on Apr. 3, 2003.

(51) Int. Cl.
*H01R 13/60* (2006.01)

(52) U.S. Cl. .................................. 439/540.1; 439/532

(58) Field of Classification Search ............ 439/540.1, 439/676, 532, 536, 557, 553, 552, 373; 211/26, 211/191, 192
See application file for complete search history.

(56) References Cited

U.S. PATENT DOCUMENTS

| | | | |
|---|---|---|---|
| 4,073,563 A * | 2/1978 | Bailey et al. ............... | 439/532 |
| 4,875,880 A | 10/1989 | Welch et al. | |
| 5,129,842 A | 7/1992 | Morgan et al. | |
| 5,161,997 A | 11/1992 | Defibaugh et al. | |
| 5,167,530 A | 12/1992 | Wallgren et al. | |
| 5,238,426 A | 8/1993 | Arnett | |
| 5,412,751 A | 5/1995 | Siemon et al. | |
| 5,575,665 A | 11/1996 | Shramawick et al. | |
| 5,639,261 A | 6/1997 | Rutkowski et al. | |
| 5,639,267 A | 6/1997 | Loudermilk | |
| 5,672,074 A | 9/1997 | Block et al. | |
| 5,827,088 A | 10/1998 | Weatherley | |
| 5,836,786 A | 11/1998 | Pepe | |
| 6,053,764 A | 4/2000 | Curry et al. | |
| 6,086,415 A | 7/2000 | Sanchez et al. | |
| 6,118,075 A | 9/2000 | Baker et al. | |
| 6,242,698 B1 | 6/2001 | Baker, III et al. | |
| 6,504,726 B1 | 1/2003 | Grabinger et al. | |
| 6,537,106 B1 | 3/2003 | Follingstad | |
| 6,585,540 B2 | 7/2003 | Gutierrez et al. | |
| 6,866,541 B2 | 3/2005 | Barker et al. | |

(Continued)

FOREIGN PATENT DOCUMENTS

DE 29822734 U1 4/1999
EP 0575072 A1 12/1993

(Continued)

OTHER PUBLICATIONS

Hubbell Premise Wiring UDX Series, Super High-Density Panels Datasheet, 2 pages, Dec. 2002.
Molex Premise Networks' 1U 48 Port PowerCat 5e Patch Panel Datasheet, 2 pages, Sep. 2003.

*Primary Examiner* — Felix O Figueroa
(74) *Attorney, Agent, or Firm* — Robert A. McCann; Christopher S. Clancy; James H. Williams (57) ABSTRACT

A patch panel includes a frame, a faceplate mountable to the frame, and at least one modular jack mountable into a rear side of the faceplate. The frame has a top flange, a bottom flange, and a plurality of faceplate opening, and the faceplate is mountable within the top flange and the bottom flange, and has a plurality of mounting openings. Each mounting opening has at least one modular jack retention latch protruding within the mounting opening.

13 Claims, 7 Drawing Sheets

U.S. PATENT DOCUMENTS

| | | |
|---|---|---|
| 6,918,786 B2 | 7/2005 | Barker et al. |
| 6,981,893 B2 | 1/2006 | Barker et al. |
| 2003/0022552 A1 | 1/2003 | Barker et al. |
| 2005/0041947 A1 | 2/2005 | Barker et al. |
| 2005/0215112 A1 | 9/2005 | Barker et al. |
| 2006/0063421 A1 | 3/2006 | Barker et al. |
| 2006/0134972 A1 | 6/2006 | Barker et al. |
| 2006/0154513 A1 | 7/2006 | Barker et al. |

FOREIGN PATENT DOCUMENTS

| | | |
|---|---|---|
| JP | 10302918 A | 11/1998 |
| JP | 2000331739 A | 11/2000 |
| JP | 2002373742 A | 12/2002 |

* cited by examiner

HIGH DENSITY PATCH PANEL

CROSS-REFERENCE TO RELATED APPLICATIONS

This application is a continuation of U.S. application Ser. No. 10/814,877, filed Mar. 31, 2004, which claims priority to U.S. Provisional Application Ser. No. 60/459,217, filed on Apr. 3, 2003, the entirety of which is hereby incorporated by reference.

BACKGROUND OF THE INVENTION

The present invention is directed to a patch panel and, more particularly, a high density patch panel utilizing six, eight-position faceplates for housing a total of 48 ports in one EIA/TIA rack unit.

24-port and 32-port patch panels having frames that mount to any standard 19-inch network rack and utilize one rack space are known in the telecommunications industry. However, prior art devices, such as the connector mounting receptacles disclosed in U.S. Pat. No. 5,672,074, require the connector to be rotated into engagement with the faceplate and, thus, require a significant amount of space between connector rows.

Moreover, 48-port patch panels having frames that mount to any standard EIA/TIA 19-inch network rack and utilize one rack space are known in the telecommunications industry. However, prior art devices, such as Hubbell's Premise Wiring's UDX Series Jack Panels, mount the jacks directly into the rear of the patch panel frame, and thus, do not have a faceplate mounted into the frame.

It would be desirable to provide an improved patch panel having a total of 48 ports in one EIA/TIA rack unit.

It would also be desirable to provide an improved patch panel having two rows of modular jacks mounted therein, with at least two modular jacks vertically aligned within the patch panel.

It would further be desirable to provide an improved patch panel having a plurality of modular jacks capable of being mounted straight into a faceplate to minimize the required distance between the two rows of modular jacks.

SUMMARY OF THE INVENTION

A patch panel is disclosed. The patch panel includes a frame, a faceplate mountable into a rear side of the frame, and at least one modular jack mountable into a rear side of the faceplate. The frame has a plurality of faceplate openings, and the faceplate has a plurality of mounting openings. Each mounting opening has at least one modular jack retention latch.

Preferably, the frame has a top flange including a plurality of first apertures and a bottom flange including a plurality of second apertures. Moreover, the frame includes indicia centered above each modular jack position.

Preferably, the frame receives six faceplates, and has a center bar extending horizontally from a first end thereof to a second end thereof. Moreover, the frame has a plurality of first mounting apertures at the first end and a plurality of second mounting apertures at the second end.

Preferably, the faceplate has a top flange including a plurality of first faceplate retention latches and a bottom flange including a plurality of second faceplate retention latches.

Preferably, each faceplate has four mounting openings and eight modular jack openings. Each mounting opening accommodates two modular jacks, and includes two modular jack retention latches and modular jack stops.

Preferably, the patch panel includes forty-eight modular jacks in one EIA/TIA rack unit, with at least two modular jacks vertically aligned within the patch panel.

DETAILED DESCRIPTION OF PREFERRED EMBODIMENTS

The illustrated embodiments of the invention are directed to a high density patch panel utilizing six, eight-position faceplates for a total of 48 ports in one rack unit. One rack unit is 1.75 inches high under the EIA/TIA standard.

Figure 1:
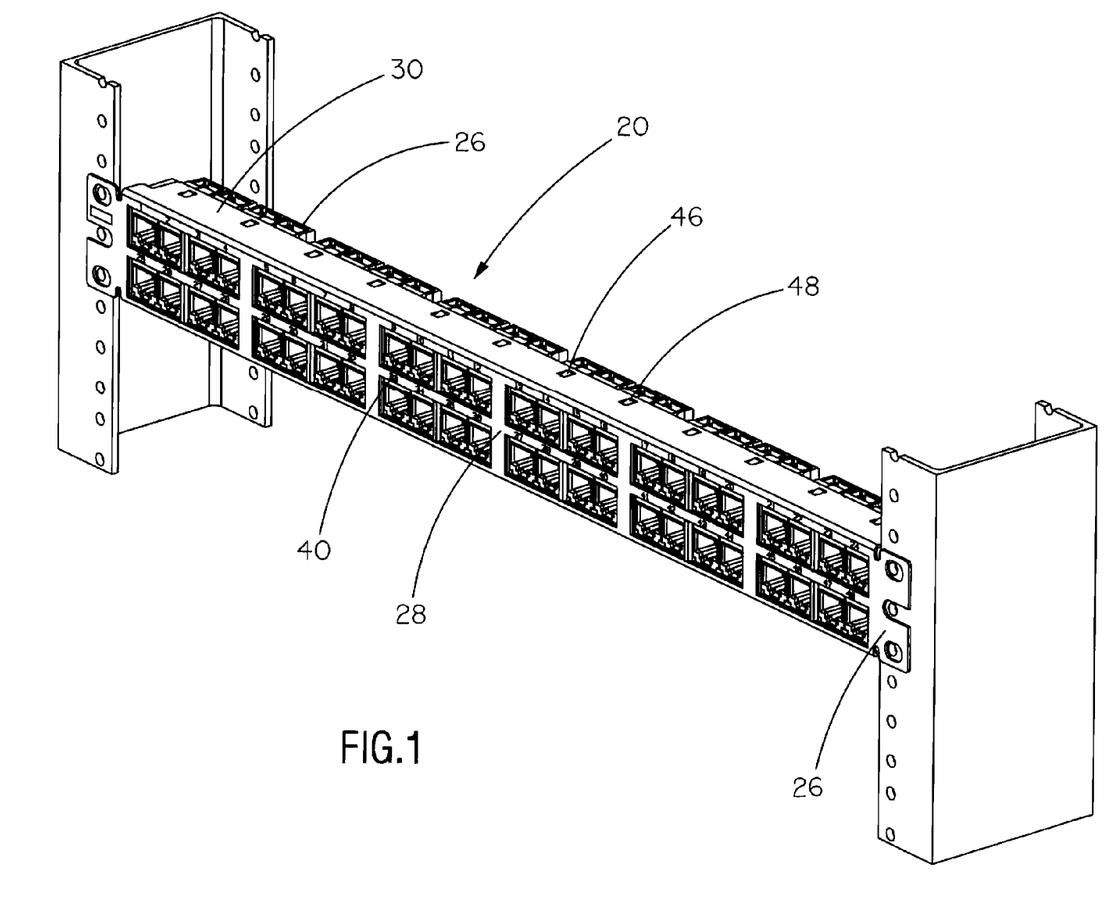
FIG. 1 is a top front right perspective view of a patch panel according to the present invention.

FIG. 1 shows a fully assembled high density patch panel 20. The patch panel 20 includes a frame 22 (see FIGS. 2-4), a plurality of faceplates, such as faceplate 24 (see FIGS. 5-8), and a plurality of modular jacks, such as modular jack 26 (see FIGS. 9-11). Preferably, the frame 22 is metal, and the faceplate 24 is plastic. However, it is likewise contemplated that the frame 22 and the faceplate 24 may be made of various materials.

Figure 12:
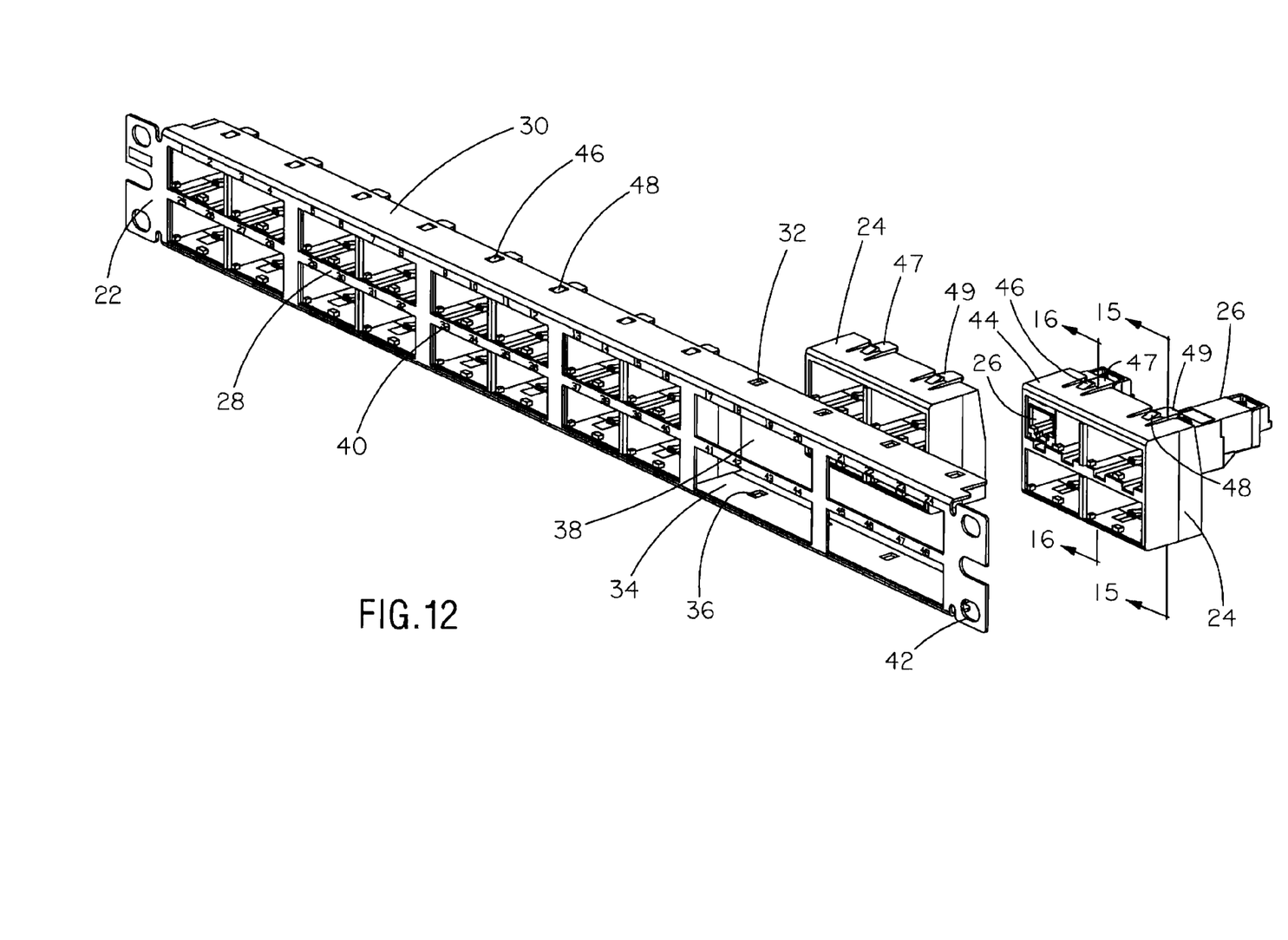
FIG. 12 is a partial exploded top front right perspective view of FIG. 1, showing the faceplates being inserted into the rear of the frame.

As best seen in FIG. 12, the patch panel 20 has six, eight-position faceplates 24. However, it is likewise contemplated that the patch panel 20 may include any number of faceplates having any number of positions. For example, the patch panel 20 may include four, twelve-position faceplates or twelve, four-position faceplates.

Figures 2, 3:
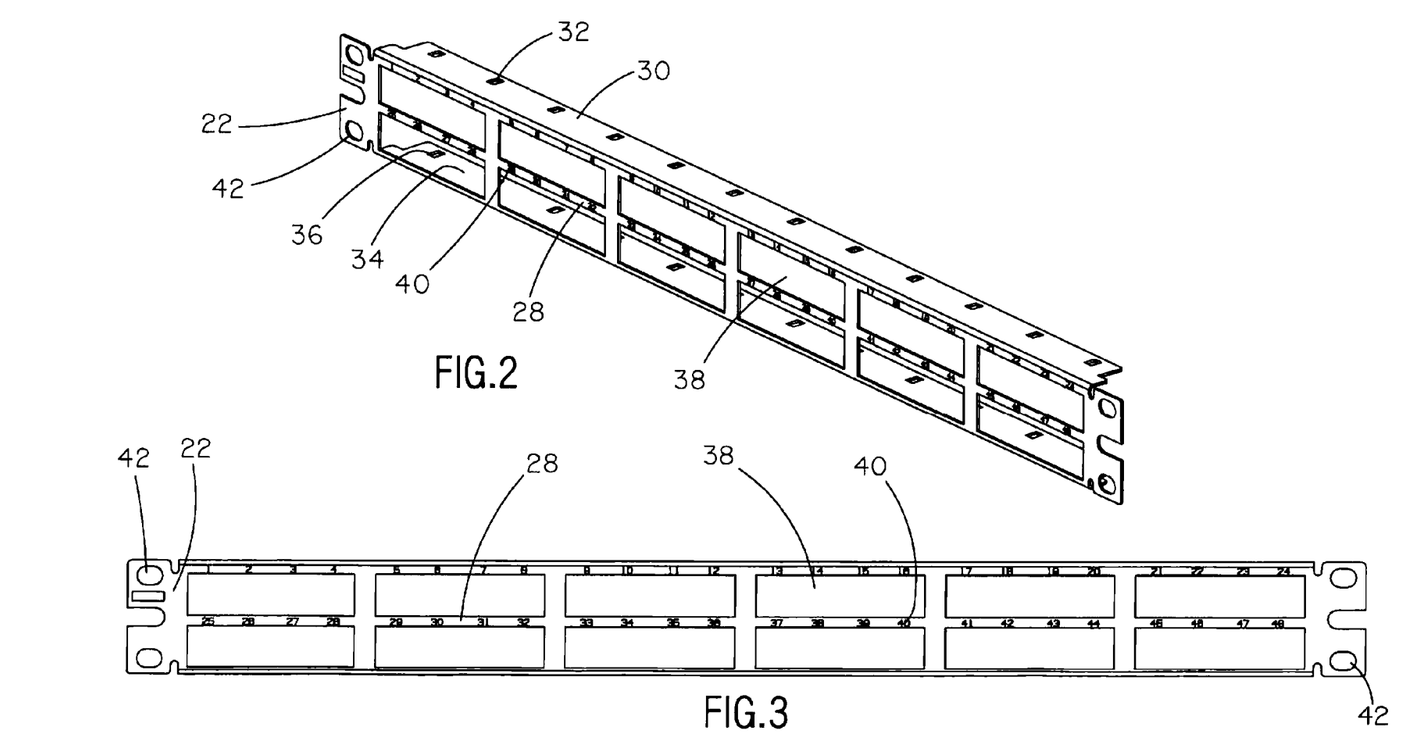
FIG. 2 is a top front right perspective view of the frame utilized in the patch panel of FIG. 1.
FIG. 3 is a front view of the frame of FIG. 2.
Figure 4:
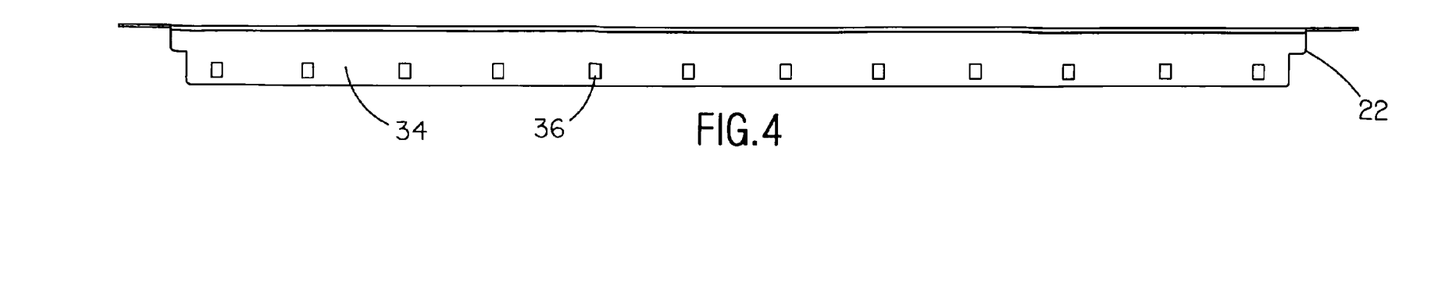
FIG. 4 is a bottom view of the frame of FIG. 2.

FIGS. 2-4 show the frame 22. Although the frame 22 is flat, it is likewise contemplated that the frame 22 may be angled, as disclosed in U.S. patent application Ser. No. 09/916,923, the disclosure of which is incorporated by reference. The frame 22 has a center bar 28 that runs the horizontal length of the frame 22 and adds strength to the frame 22. The center bar 28 divides each faceplate opening 38 into two separate openings. As best seen in FIG. 2, the frame 22 has a top flange 30 including a plurality of apertures, such as aperture 32. Similarly, as best seen in FIG. 4 the frame 22 has a bottom flange 34 including a plurality of apertures, such as aperture 36. The apertures 32, 36 allow the faceplate 24 to be snap-mounted into the rear side of the frame 22.

Figure 9:
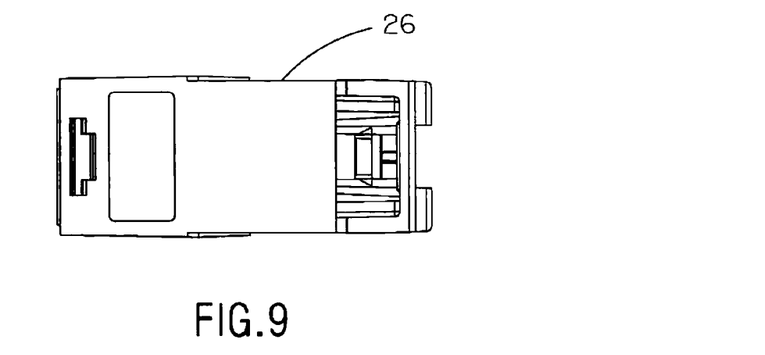
FIG. 9 is a top view of one of the modular jacks utilized in the patch panel of FIG. 1.
Figure 10:
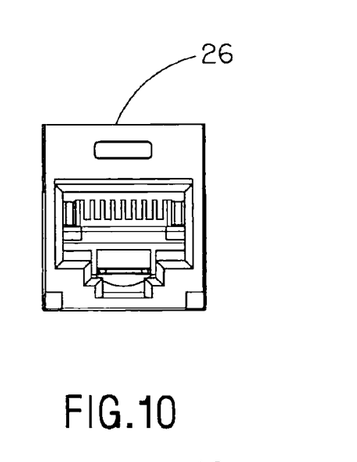
FIG. 10 is a front view of the modular jack of FIG. 9.
Figure 11:
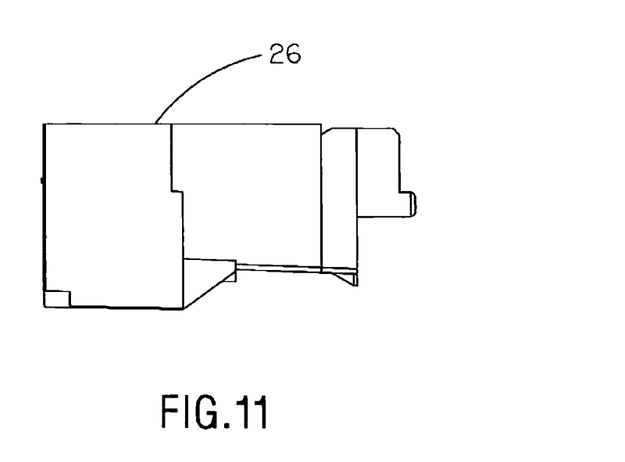
FIG. 11 is a right side view of the modular jack of FIG. 9.

As best seen in FIGS. 2 and 3, the frame 22 has a plurality of faceplate openings, such as faceplate opening 38, for receiving a plurality of modular jacks, such as modular jack 26 shown in FIGS. 9-11. Indicia 40, such as numbers 1-48, are silk-screened and centered above each module opening for identifying each individual port on the frame 22. The frame 22 also includes a plurality of mounting apertures, such as mounting aperture 42, for securing the frame 22 to any standard EIA/TIA 19-inch rack.

Figure 5:
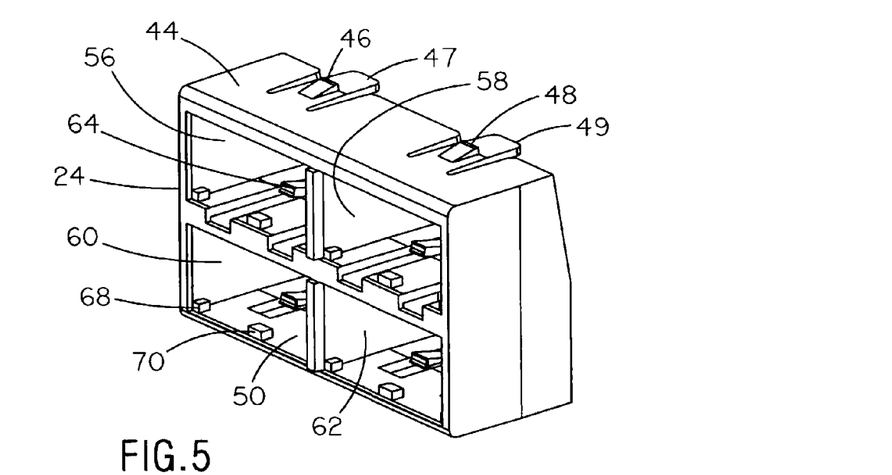
FIG. 5 is a top front right perspective view of one of the faceplates utilized in the patch panel of FIG. 1.
Figure 8:
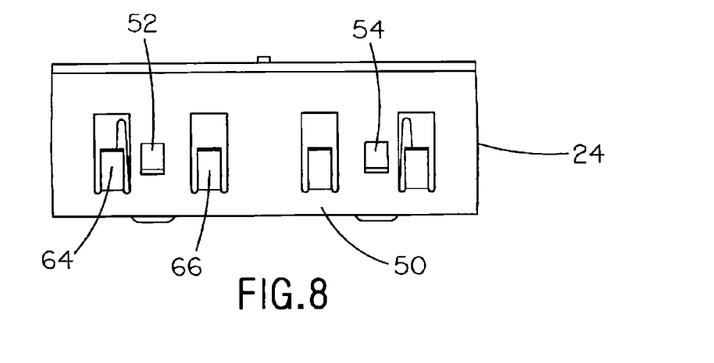
FIG. 8 is a bottom view of the faceplate of FIG. 5.

FIGS. 5-8 show the faceplate 24. As best seen in FIG. 5, the faceplate 24 has a top flange 44 including two faceplate retention latches 46, 48 and two release arms 47, 49. Similarly, as best seen in FIG. 8, the faceplate has a bottom flange 50 including two faceplate retention latches 52, 54. The retention latches 46, 48, 52, 54 allow the faceplate 24 to be snap-mounted into the rear side of the frame 22, as shower in FIG. 12, and the release arms 47,49 allow the faceplate to be removed from the frame 22.

Figure 6:
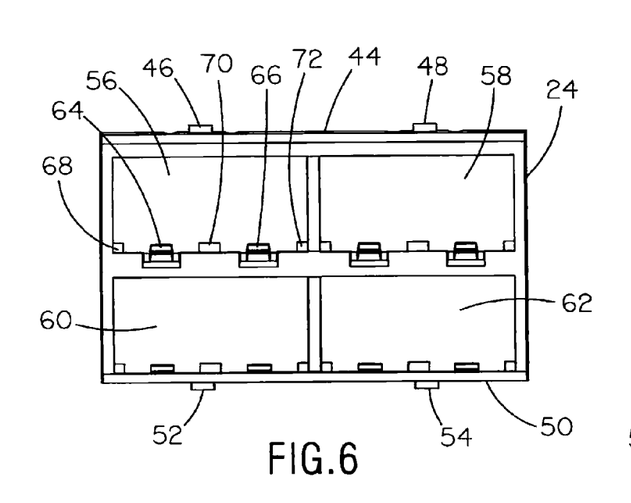
FIG. 6 is a front view of the faceplate of FIG. 5.
Figure 7:
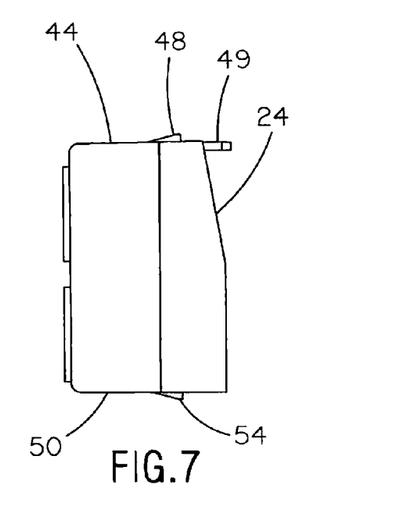
FIG. 7 is a right side view of the faceplate of FIG. 5.

As best seen in FIGS. 5 and 6, the faceplate 24 has four mounting openings 56, 58, 60, 62, and each mounting opening accommodates only two modular jacks to increase the strength of the faceplate 24. Each mounting opening includes two modular jack retention latches 64, 66, which allow the modular jacks to be mounted straight into the rear of the faceplate 24. The modular jack retention latches 64, 66 maximize the patch panel density because the straight-in insertion of the modular jacks minimizes the required distance between two vertically stacked modular jacks. Each mounting opening also includes three modular jack stops 68, 70, 72, which in conjunction with top flange 44, secure two modular jacks therein.

Figure 13:
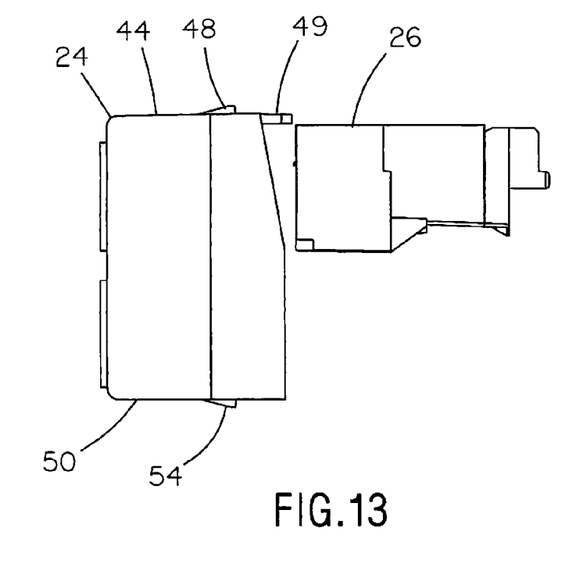
FIG. 13 is a right side view of the faceplate similar to FIG. 7, showing the modular jack prior to insertion into the faceplate.
Figure 14:
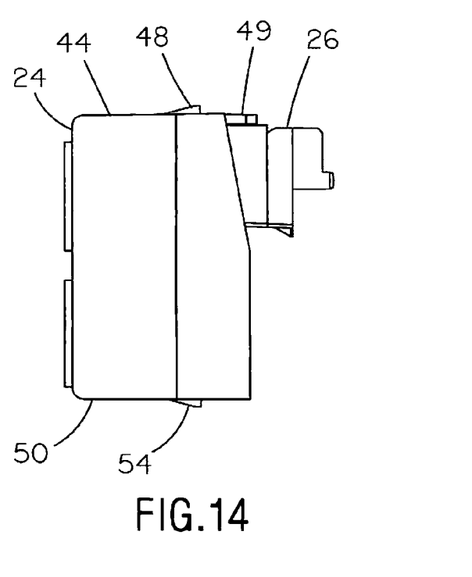
FIG. 14 is a right side view of the faceplate similar to FIG. 7, showing the modular jack after insertion into the faceplate.
Figure 15:
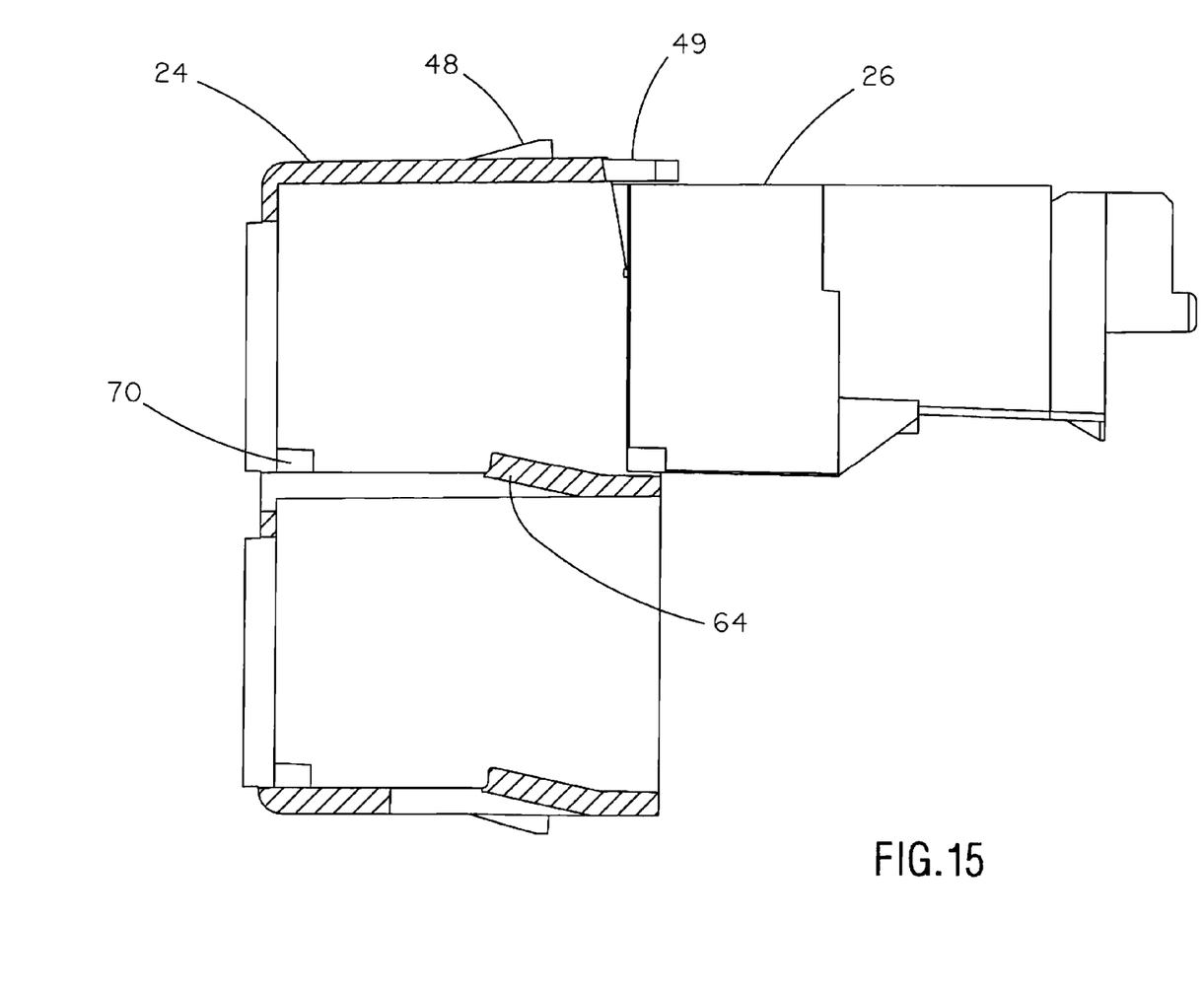
FIG. 15 is a cross-sectional view taken along lines 15-15 of FIG. 12, showing the modular jack prior to insertion into the faceplate.
Figure 16:
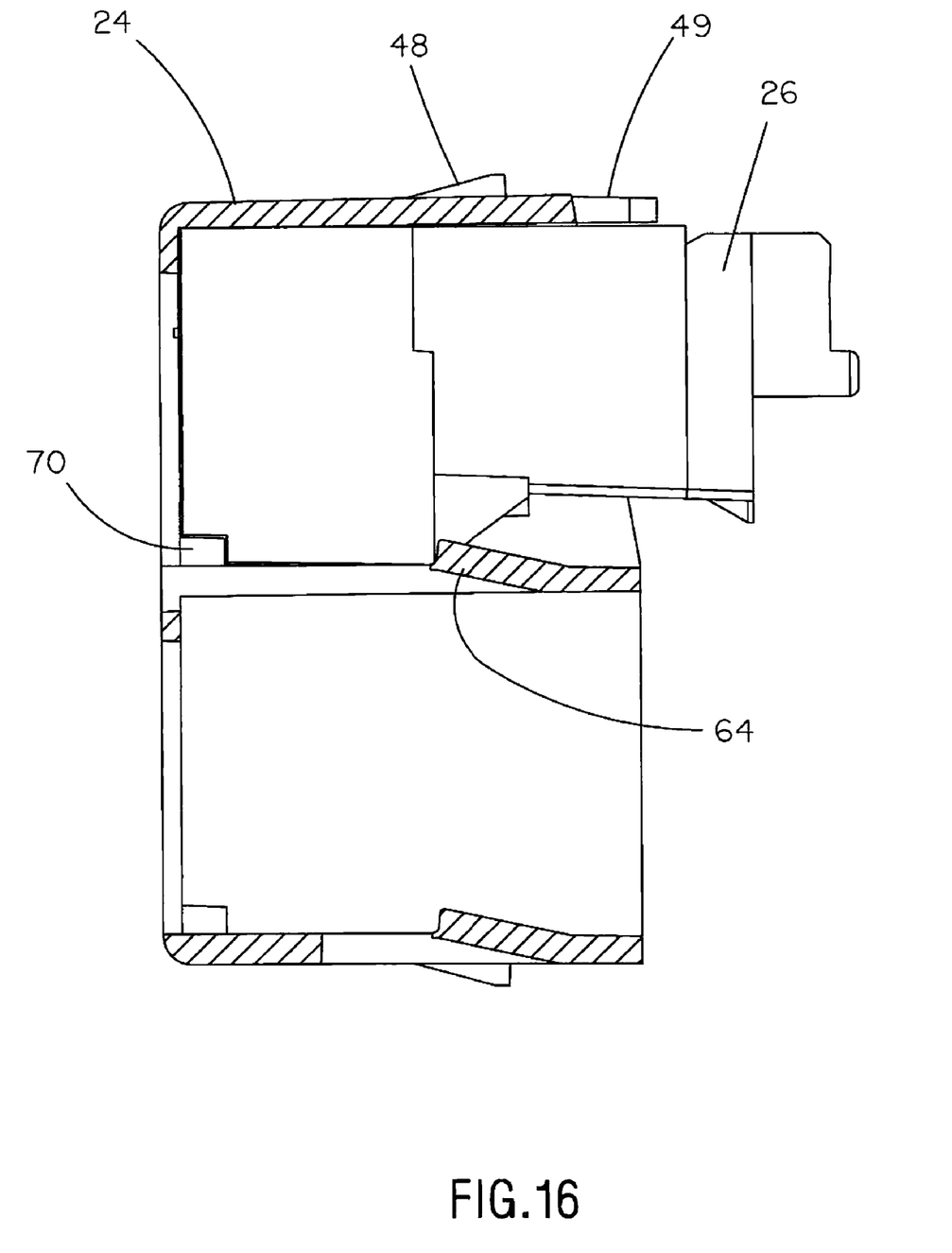
FIG. 16 is a cross-sectional view taken along lines 16-16 of FIG. 12, showing the modular jack after insertion into the faceplate.

In operation, the faceplate 24 is snap-mounted into the rear of the frame 22, as best seen in FIG. 12. Once all six faceplates are inserted into the rear of the frame 22, the plurality of modular jacks are inserted into the rear of the faceplates. FIGS. 13 and 15 show the modular jack 26 prior to insertion into the rear of the faceplate 24. As best seen in FIG. 15, the modular jack 26 abuts the rear of the modular jack retention latch 64. Conversely, FIGS. 14 and 16 show the modular jack 26 after insertion into the rear of the faceplate 24. As best seen in FIG. 16, the modular jack retention latch 64 abuts the rear of the modular jack 26, and the front of the modular jack 26 abuts the modular jack stop 70.

The disclosed invention provides a high density patch panel having a plurality of faceplates mounted therein, each faceplate having modular jack retention latches that allow modular jacks to be mounted straight into the rear of the faceplate. It should be noted that the above-described and illustrated embodiments and preferred embodiments of the invention are not an exhaustive listing of the forms such a patch panel in accordance with the invention might take; rather, they serve as exemplary and illustrative of embodiments of the invention as presently understood. By way of example, and without limitation, a patch panel having a faceplate including modular jack retention latches on the side walls thereof is contemplated to be within the scope of the invention. Many other forms of the invention are believed to exist.

The invention claimed is:

1. A patch panel comprising:
   a frame having a top flange and a bottom flange, the frame including a plurality of faceplate openings;
   a faceplate mountable to the frame within the top flange and the bottom flange, the faceplate having a top flange, a bottom flange, and a plurality of mounting openings, the top flange having at least one first faceplate retention latch and at least one release arm, the at least one release arm extending beyond a rearmost edge of the faceplate, the bottom flange having at least one second faceplate retention latch, and each of the mounting openings having at least one modular jack retention latch extending into the mounting opening and toward a front side of the faceplate; and
   at least one modular jack mountable into each of the mounting openings from a rear side of the faceplate such that the at least one modular jack causes the at least one modular jack retention latch to deflect.

2. The patch panel of claim 1, wherein the top flange of the frame has a plurality of first apertures and the bottom flange of the frame has a plurality of second apertures.

3. The patch panel of claim 2, wherein at least one of the first apertures receives at least one first faceplate retention latch, and at least one of the second apertures receives at least one second faceplate retention latch.

4. The patch panel of claim 1, wherein the frame has a center bar extending horizontally from a first end thereof to a second end thereof.

5. The patch panel of claim 1, wherein the frame includes indicia centered above each modular jack position.

6. The patch panel of claim 1, wherein the frame has a plurality of first mounting apertures at a first end thereof and a plurality of second mounting apertures at a second end thereof.

7. The patch panel of claim 1, wherein the faceplate is releasably mounted to the frame.

8. The patch panel of claim 1, wherein the faceplate is mounted into a rear side of the frame.

9. The patch panel of claim 1, wherein each mounting opening includes a plurality of modular jack stops that define a lateral position of the modular jack.

10. The patch panel of claim 9, wherein the plurality of modular jack stops are disposed along a bottom flange of the faceplate.

11. The patch panel of claim 1, wherein each modular jack is releasably mounted to the faceplate.

12. The patch panel of claim 1, wherein each modular jack is mounted to the faceplate in the same orientation.

13. The patch panel of claim 1, wherein each modular jack is slidingly installed along a linear path into a mounted position in the faceplate.

* * * * *

UNITED STATES PATENT AND TRADEMARK OFFICE
CERTIFICATE OF CORRECTION

| | | |
|---|---|---|
| PATENT NO. | : 8,382,515 B2 | Page 1 of 1 |
| APPLICATION NO. | : 12/206837 | |
| DATED | : February 26, 2013 | |
| INVENTOR(S) | : Jack E. Caveney et al. | |

It is certified that error appears in the above-identified patent and that said Letters Patent is hereby corrected as shown below:

In the Specification

Col. 3/Line 21: Error reads as "…as shower in…" and should read as "…as shown in…"

Signed and Sealed this
Eighteenth Day of February, 2014

Michelle K. Lee
*Deputy Director of the United States Patent and Trademark Office*